United States Patent Office 3,389,148
Patented June 18, 1968

3,389,148
PROCESSES FOR THE PREPARATION OF RING-SUBSTITUTED 2 - IMINO - 1,3 - DITHIOHETEROCYCLE COMPOUNDS
Thomas Andrew Lies, Montgomery Township, Somerset County, N.J., assignor to American Cyanamid Company, Stamford, Conn., a corporation of Maine
No Drawing. Filed Aug. 31, 1966, Ser. No. 576,242
9 Claims. (Cl. 260—327)

The present invention relates to novel processes for preparing five and six membered dithio heterocyclic compounds. More particularly, the invention relates to the preparation of a ring-substituted 2-imino-1,3-dithiole, dithiane or dithiolane and the non-oxidizing acid addition salts thereof, said compounds being represented by the general formulas:

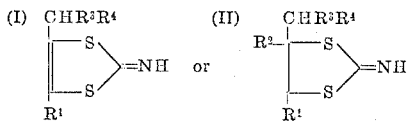

or

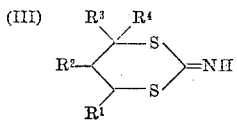

where $R^1$, $R^2$, and $R^3$ are radicals, each of which stands for hydrogen, lower alkyl, cycloalkyl, or aralkyl, and where $R^4$ is either a hydrogen or aryl radical, provided that when $R^4$ is aryl, the compound obtained is the six-membered heterocycle and that when $R^4$ is hydrogen, the compound obtained is either of the five-membered heterocycles, and the hydrochloride, hydrobromide, hydroiodide and sulfate salts of each compound.

The substituted 1,3-dithiole, 1,3-dithianes, or 1,3-dithiolanes or salts thereof, prepared by the process of the invention, find utility as intermediates in the preparation of phosphorylated imino compounds. The latter are formed by reacting in substantially equimolar proportions the 2-imino-5- or 6-membered heterocycle as herein prepared with a phosphorylating reagent, such as, for instance:

O,O-dimethyl phosphorochloridothioate,
O,O-diethyl phosphorochloridothioate,
O-methyl O-ethyl phosphorochloridothioate,
O,O-di-isopropyl phosphorobromidothioate,
O,O-di-n-butyl phosphorochloridothioate,
O,O-di-sec-pentyl phosphoroiodothioate,
O,O-dimethyl phosphorochloridate,
O,O-diethyl phosphorochloridate,
O-ethyl ethylphosphonochloridothioate,
O-ethyl N,N-dimethylphosphoramidochloridothioate,
O-ethyl phenylphosphonochloridothioate,
O-ethyl N-isopropylphosphoramidochloridothioate,
O-ethyl N-methylphosphoramidochloridothioate,
Diethyl phosphorochloridotrithioate, and
Diethylphosphinothioyl bromide.

Phosphorylated imino compounds so-formed are found to possess good insecticidal, acaricidal and nematocidal properties.

Ring-unsubstituted 2-imino-1,3-dithioheterocycles and their acid addition salts can be readily prepared. One process involves the reaction between a cyanogen halide and cis-1,2-dimercaptoethylene in the presence of an anhydrous acidified alcohol to yield 2-imino-1,3-dithiole hydrohalide. Unfortunately, this process is not applicable to the preparation of the ring-substituted 2-imino-1,3-dithioles, since the required dimercaptoalkylene intermediates are not known. Similarly, 2-imino-1,3-dithiolane can be prepared in good yields by a reaction involving 2-hydroxyethyl dithiocarbamate and a hydrogen halide. However, the ring-substituted derivatives of 2-imino-1,3-dithiolane can be prepared from 2-hydroxyalkyl dithiocarbamates other than 2-hydroxyethyl dithiocarbamate only in substantially reduced yields. It is further known that ring-substituted 2-imino-1,3-dithiolanes can be prepared in satisfactory yields from 1,2-alkanedithiols, such as, 1,2-propanedithiole, and a cyanogen halide. However, this process is not entirely satisfactory because of high process costs resulting from the hazardous nature of the cyanogen halide reactants and the vile odors of the dimercaptoalkane intermediates as well as the high cost of each of the reactants.

It is a principal object of the present invention, therefore, to provide a process for preparing ring-substituted 2-imino-1,3-dithioles, 2-imino-1,3-dithiolanes and 2-imino-1,3-dithianes involving the use of relatively safe, inoffensive and inexpensive reactants. It is a further object of the invention to provide a straightforward process for preparing ring-substituted derivatives of 5- and 6-membered dithioheterocyclic compounds in good yields and purity. Other objects and advantages of the invention will become apparent from a consideration of the ensuing description.

In accordance with the process of the invention, either allyl dithiocarbamate or a suitably-substituted allyl dithiocarbamate is reacted with a non-oxidizing mineral acid, such as hydrochloric acid, hydrobromic acid, or sulfuric acid, as a concentrated acidic solution. If desired, the reaction can be carried out in an inert inorganic or organic medium, such as water, alcohol, or mixtures of the same. Usually, it is a good practice to employ from one to four moles of the acid per mole of the allyl dithiocarbamate.

Illustrative alternative processes of the invention may be graphically represented as follows:

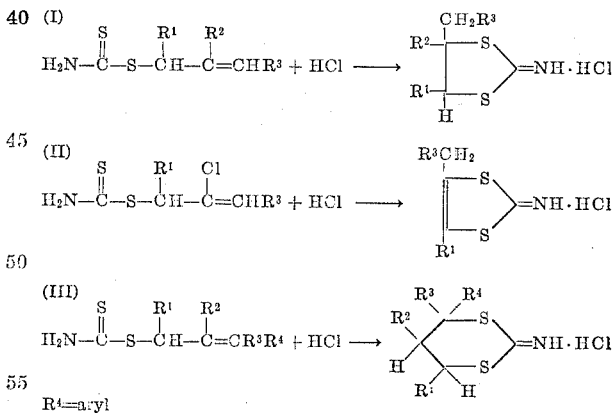

$R^4$=aryl

Each of the R groups in the above equations is as defined above and hydrochloric acid has been used illustratively to represent a non-oxidizing mineral acid.

In a preferred embodiment, about a two to one mole ratio of the concentrated, non-oxidizing mineral acid to dithiocarbamate is employed. Advantageously, the reaction can be conducted over a wide range of temperatures, usually between about 20° C. and 50° C., or higher. For instance, where as in Equation II above 2-haloallyl dithiocarbamate, such as 2-chloroallyl dithiocarbamate, and acid are reacted, a temperature between about 80° C. and about 100° C. is employed so as to obtain a maximum yield. Desired product may then be recovered as by cooling to precipitate and isolate the desired product, usually in yields of 70% or better.

In general, a wide variety of dithiocarbamate reactants can be advantageously employed herein. These include, for instance:

Allyl dithiocarbamate,
2-butenyl dithiocarbamate,
2-methylallyl dithiocarbamate,
1-methylallyl dithiocarbamate,
2-chloroallyl dithiocarbamate,
2-bromoallyl dithiocarbamate,
2-benzylallyl dithiocarbamate,
3-phenylallyl dithiocarbamate, and
3-cyclohexylallyl dithiocarbamate.

For a further understanding of the present invention, the following illustrative, non-limiting examples are presented.

Example 1.—Preparation of 2-imino-4-methyl-1,3-dithiolane hydrochloride

Into a suitable stopped flask are introduced allyl dithiocarbamate (1.3 grams, 0.010 mole) and concentrated hydrochloric acid (2.0 milliliters, ca. 0.024 mole). The allyl dithiocarbamate dissolves within 4.5 hours at 24° C. The solution remains quiescent for about 16 hours and is then filtered to remove a small amount of waxy material. Acetone (80 milliliters) is next added for purposes of precipitating desired product. The flask and remaining contents are cooled to −15° C. and a precipitate of white colored 2-imino-4-methyl-1,3-dithiolane hydrochloride weighing 1.4 grams and having a melting point of 166° C.–170° C. is collected. The weight of the product corresponds to an 82% yield and the infrared spectrum of the product is identical with that of an authentic 2-imino-4-methyl-1,3-dithiolane hydrochloride sample whose melting point is 168° C.–170° C.

Example 2.—Preparation of 2-imino-4-methyl-1,3-dithiolane sulfate (1:1)

Concentrated sulfuric acid (1.2 grams, 0.012 mole) is added to three portions at about 15-minute intervals to a stirred solution of allyl dithiocarbamate (1.3 grams, 0.010 mole) in ethyl acetate (3 milliliters) at 48° C.–50° C. After the addition has been completed, stirring of the solution at 50° C. is continued for a three-hour period during which time a second liquid layer separates from the reaction solution. The latter is next diluted to 15 milliliters with acetone and the upper layer is decanted. The lower layer is next leached twice with 15-milliliter portions of acetone. So-leached material is evacuated under vacuum, thereby leaving an amber viscous syrup containing 2-imino-4-methyl-1,3-dithiolane sulfate (1:1).

To establish the identity of the resultant salt, the latter is dissolved in an equal volume of water and the solution is overlaid with ether. Neutralization of the aqueous layer with solid sodium bicarbonate and sodium carbonate yields an ether solution of the free base, namely, 2-imino-4-methyl-1,3-dithiolane. There is next added alcoholic hydrogen chloride to the ether solution whereby 2-imino-4-methyl-1,3-dithiolane hydrochloride precipitates. On analysis, a melting point of from 160° C. to 166° C. (prior sintering) of the latter salt is obtained which is identical to the salt prepared in Example 1 above by its infrared spectrum.

Example 3.—Preparation of 2-imino-4-ethyl-1,3-dithiolane hydrochloride 2-butenyl dithiocarbamate (4.4 grams, 0.030 mole) is dissolved in 4.1 grams (about 0.045 mole) of a previously prepared saturated solution of hydrogen chloride in absolute ethanol. The solution is allowed to stand at 24° C. in a stoppered flask for four days during which period of time a crystalline precipitate forms. Acetone (20 milliliters) is then added and the flask is kept at about −10° C. for two days. The precipitate, which weighs 3.1 grams and possessing a melting point of from 144° C. to 163.5° C., is collected and recrystallized from absolute ethanol, ethanol-acetone solutions, and from methanol-ether solutions so as to yield 1.1 grams of 2-imino-4-ethyl-1,3-dithiolane hydrochloride, whose melting point lies between 162° C. and 165.5° C. (prior sintering). An authentic sample possesses a melting point between 161° C. and 163° C. Further, the infrared spectrum of the purified product is found to be identical with that of an authentic sample.

The 2-butenyl dithiocarbamate reactant used in the above reaction can be obtained as follows: A slurry of ammonium dithiocarbamate (22.0 grams, 0.2 mole) in methanol (100 milliliters) is cooled to 5° C. and 1-bromo-2-butene (27.0 grams, 0.2 mole) is added dropwise while stirring at from 4° C. to 7° C. After addition, the reaction mixture is allowed to warm to 25° C. and is then poured over crushed ice. The mixture is diluted with water and the oily solid product is filtered off and dissolved in ether (100 milliliters). The latter solution is dried over magnesium sulfate and concentrated in vacuo to leave a residue which is recrystallized from ether-pentane and methylene chloride-pentane mixtures to yield 12.8 grams of 2-butenyl dithiocarbamate having a melting point of from 41.5° C. to 46° C.

A portion of the product is recrystallized from methylene chloride-pentane solution to yield an analytical sample having a melting point from 43.5° C. to 46.5° C.

Analysis.—Calcd. for $C_5H_9NS_2$: C, 40.77; H, 6.16; N, 9.51; S, 43.64. Found: C, 41.19; H, 6.30; N, 9.69; S, 43.56.

Example 4

Following the procedure of Example 3 in every detail but substituting 2-benzylallyl dithiocarbamate (as prepared from ammonium dithiocarbamate and 2-benzylallyl chloride) in lieu of 2-butenyl dithiocarbamate, a good yield of 2-imino-4-benzyl-4-methyl-1,3-dithiolane hydrochloride is obtained.

Similarly, substituting in Example 3 above, 3-cyclohexylallyl dithiocarbamate for 2-butenyl dithiocarbamate, 2-imino-4-cyclohexylmethyl-1,3-dithiolane hydrochloride is obtained in good yields. The 3-cyclohexylallyl dithiocarbamate is prepared from ammonium dithiocarbamate and 3-cyclohexylallyl bromide. The latter bromide, in turn, is prepared by the reaction of phosphorus tribromide and pyridine with 3-cyclohexylallyl alcohol. This alcohol can be synthesized by the reduction of β-cyclohexylacrylic acid with lithium aluminum hydride.

Example 5.—Preparation of 2-imino-4,4-dimethyl-1,3-dithiolane hydrochloride

In a suitable reaction vessel, 2-methylallyl dithiocarbamate (1.5 grams, 0.010 mole) and concentrated hydrochloric acid (2.0 milliliters, ca. 0.024 mole) are mixed and occasionally agitated. A mild exotherm is noted and the dithiocarbamate quickly dissolves. After three hours, the light-yellow solution which contains a few oily droplets is poured into acetone (125 milliliters), and after the flask has been cooled to −15° C., precipitated product is filtered off and leached in acetone (25 milliliters) at 25° C. for 16 hours. The insoluble product, 2-imino-4,4-dimethyl-1,3-dithiolane hydrochloride, which is found to possess a melting point equal to 186.5° C.–191.5° C., weighs 1.3 grams corresponding to a yield of 70.6%.

The infrared spectrum of the product is identical in all essential details with that of an authentic sample.

The reactant: 2-methylallyl dithiocarbamate can be prepared as follows: 3-chloro-2-methylpropene (27.2 grams, 0.30 mole) is added dropwise over five minutes to a stirred cold (5°) slurry of ammonium dithiocarbamate (33.6 grams, 0.30 mole) in methanol (200 milliliters). The reaction mixture is stirred at 5° for about ten minutes after addition, then the temperature is allowed to rise slowly to 20° C. and the reaction mixture is poured on cracked ice. The initially-precipitated oil solidifies to give 16.5 grams (37%) of white 2-methylallyl dithiocarbamate, melting point 34° C.–35° C. For further purification, an ether solution of the product is dried over magnesium sulfate and concentrated in vacuo without heat to leave a yellow oil which crystallizes when seeded.

For analysis, the solid is recrystallized from methylene chloride to give 2-methylallyl dithiocarbamate, melting point 40° C.–41° C.

*Analysis.*—Calcd. for $C_5H_9NS_2$: C, 40.77; H, 6.16; N, 9.51; S, 43.64. Found: C, 40.93; H, 6.09; N, 9.52; S, 43.64.

Example 6.—Preparation of 2-imino-4,5-dimethyl-1,3-dithiolane hydrochloride 1-methylallyl dithiocarbamate (5.9 grams, 0.04 mole) dissolves with a mild exotherm over about 30 minutes in 7.3 grams (ca. 0.080 mole) of a previously-prepared saturated solution of hydrogen chloride in absolute ethanol. The resultant yellow solution is kept at 24° C. for two days. Crystallization of the product is then induced by seeding, and the mixture is kept at 24° C. for another 19 hours; then the mixture is kept at —15° C. for four days. The cold supernatant is decanted and the solid precipitate is triturated with acetone and the mixture is cooled to —15° C. The off-white solid, melting point <150° C.–169° C., weight 5.7 grams, is filtered off and recrystallized from methanol-ether solution to give 5.3 grams (72%) of a white powder, melting point 145° C.–172° C. (red melt), which proves to be a mixture of the cis and trans isomers of 2-imino-4,5-dimethyl-1,3-dithiolane hydrochloride. The mixture is recrystallized from methanol-ether solution to give 4.5 grams of isomer mixture, melting point 150° C.–171° C. (red melt) which is stirred with 2-propanol (50 milliliters) at 25° C. for 18 hours. The undissolved solid is then filtered off and dried. The n.m.r. spectrum of the dry white solid, weight 2.3 grams, melting point 178° C.–182.5° C. (prior sintering, red melt) shows that it is cis-2-imino-4,5-dimethyl-1,3-dithiolane hydrochloride (by comparison with the n.m.r. spectrum of the known trans isomer).

A portion of the cis isomer is recrystallized from methanol-ether solution to give the anlytical sample of cis-2-imino-4,5-dimethyl-1,3-dithiolane hydrochloride, melting point 180° C.–185.5° C. (red melt).

*Analysis.*—In percent: Calcd. for $C_5H_{10}NS_2Cl$: C, 32.70; H, 5.49; N, 7.63; S, 34.91; Cl, 19.30. Found: C, 32.71; H, 5.34; N, 7.80; S, 34.82; Cl, 19.50.

The above reactant: 1-methylallyl dithiocarbamate is prepared as follows: A slurry of ammonium dithiocarbamate (44.0 grams, 0.40 mole) in methanol (200 milliliters) is prepared in a flask equipped with stirrer, dropping funnel, and reflux condenser. 3-chloro-1-butene (36.2 grams, 0.40 mole) is added dropwise at a rapid rate while a temperature of 40° C.–45° C. is maintained by external warming. When addition is complete, the mixture is allowed to cool slowly to 30° C. and then poured into 1 liter of ice-water mixture. The insoluble oil is taken up in ether. The ether solution is washed with water, dried over magnesium sulfate, filtered, and concentrated in vacuo to leave a yellow oil which crystallizes when chilled to —15° C. and seeded to give 30.4 grams of a pale-yellow solid, melting point 40.5° C.–60° C. Two recrystallizations from methylene chloride-pentane solution and one from chloroform-pentane solution give 13.6 grams of 1-methylallyl dithiocarbamate, melting point 69° C.–72.5° C. (prior sintering).

A portion of the off-white product is twice recrystallized from chloroform-pentane solution to give the analytical sample, melting point 69.5° C.–72.5° C. (slight prior sintering).

*Analysis.*—In percent: Calcd. for $C_5H_9NS_2$: C, 40.77; H, 6.16; N, 9.51; S, 43.64. Found: C, 40.51; H, 6.24; N, 9.58; S, 43.97.

Example 7.—Preparation of 2-imino-4-methyl-1,3-dithiole hydrochloride

A solution of 2-chloroallyl dithiocarbamate (12.5 grams, 0.075 mole) in concentrated hydrochloric acid (19.5 milliliters, ca. 0.234 mole) and absolute ethanol (7 milliliters) is refluxed for four hours. The reaction mixture is poured into acetone (700 milliliters) and the mixture is maintained at —15° C. for 16 hours. The resultant solid precipitate is filtered off, washed with acetone, and dried in vacuo to give 8.7 grams (69%) of 2-imino-4-methyl-1,3-dithiole hydrochloride. Its decomposition point ranges from 168.5° C.–171.5° C.

A sample of the crude product from another preparation is recrystallized twice from methanol-ether solution to give the analytical sample, decomposition point 169° C.–174° C.

*Analysis.*—In percent: Calcd. for $C_4H_6NS_2Cl$: C, 28.65; H, 3.61; N, 8.35; S, 38.25; Cl, 21.14. Found: C, 28.64; H, 3.60; N, 8.49; S, 38.18; Cl, 21.33.

The above reactant, 2-chloroallyl dithiocarbamate, is prepared by stirring a mixture of ammonium dithiocarbamate (44.0 grams, 0.40 mole) and 2,3-dichloropropene (44.4 grams, 0.40 mole) in methanol (150 milliliters) and warming the mixture to 33° C. An exotherm is noted and the temperature of the reaction mixture is held to 40° C.–42° C. by external cooling until the exotherm is complete. The reaction mixture is next warmed to from 45° C.–50° C. for 20 minutes. It is then cooled, filtered, and poured on cracked ice. The resulting precipitate is filtered off and dissolved in ether. The dried ether solution is concentrated to leave a brown oil which is dissolved in ether-pentane solution. From the cold solution is obtained 40.7 grams (60%) of 2-chloroallyl dithiocarbamate, having a melting point of 50° C.–53.5° C. Recrystallization from the same solvent pair gives the analytical sample whose melting point ranges from 50° C. to 53° C.

*Analysis.*—Calcd, for $C_4H_6NS_2Cl$: C, 28.65; H, 3.61; N, 8.35; S, 38.25; Cl, 21.14. Found: C, 28.51; H, 3.65; N, 8.30; S, 38.02; Cl, 21.29.

Example 8.—Preparation of 2-imino-4-phenyl-1,3-dithiane hydrochloride

A mixture of 3-phenylallyl dithiocarbamate (4.2 grams, 0.020 mole) and saturated absolute ethanolic hydrogen chloride (7.14 grams of solution, ca. 0.078 mole HCl) is prepared and allowed to stand at 24° C. in a suitable stoppered flask for 90 hours. The supernatant is decanted and the white solid in the flask is triturated with acetone to yield 3.1 grams (63%) of 2-imino-4-phenyl-1,3-dithiane hydrochloride, decomposition point equal to 212° C–214° C.

Two recrystallizations from hot methanol give an analytical sample, whose decomposition point is 214° C. with gas evolution and solid-liquid melt.

*Analysis.*—In percent: Calcd. for $C_{10}H_{12}NS_2Cl$: C, 48.85; H, 4.92; N, 5.70; S, 26.09; Cl, 14.42. Found: C, 48.96; H, 4.96; N, 5.51; S, 26.25; Cl, 14.34.

The six-membered ring structure obtained is established by the n.m.r. spectrum of the compound.

In preparing the reactant 3-phenylallyl dithiocarbamate, a three-neck round bottom flask is fitted with a thermometer, mechanical stirrer, and dropping funnel and ammonium dithiocarbamate (24.2 grams, 0.22 mole) slurried in 150 milliliters of methanol and cooled to 5° C. in an ice-water bath is introduced. There is next added (3-chloropropenyl)benzene (33.6 grams, 0.22 mole) over a period of about 8 minutes. When the addition is complete, the mixture is stirred at about 12° C. for ten minutes and the reaction mixture is allowed to warm up to about 20° C. The mixture is poured into 500 milliliters of ice with vigorous stirring. After adding 200 milliliters of water to melt the ice, the white solid is collected, washed with water, and air dried to yield 41.7 grams of 3-phenylallyl-dithiocarbamate having a melting point of 125° C.–126° C.

I claim:
1. A method of effecting the cyclization of an allyl dithiocarbamate to obtain ring-substituted dithioheterocyclic derivatives which comprises: contacting (a) an allyl dithiocarbamate selected from the group consisting of compounds represented by the formulas:

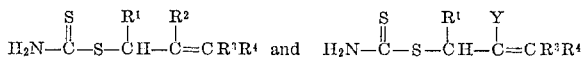

wherein Y is a halogen atom, $R^1$, $R^2$, and $R^3$ are each substituents selected from the group consisting of hydrogen, lower alkyl, cycloalkyl, and aralkyl, and $R^4$ is a substituent selected from the class consisting of hydrogen and aryl with (b) a non-oxidizing mineral acid selected from the group consisting of hydrochloric acid, hydrobromic acid and sulfuric acid, and recovering a ring-substituted product selected from the group consisting of:

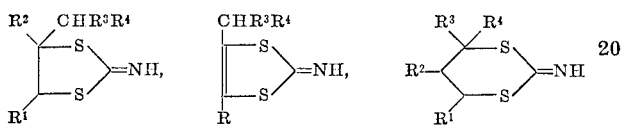

and the corresponding non-oxidizing acid salt thereof wherein $R^1$, $R^2$, $R^3$ and $R^4$ are as defined above.

2. The method according to claim 1 wherein the mineral acid is hydrochloric acid.
3. The method according to claim 1 wherein the mineral acid is hydrobromic acid.
4. The method according to claim 1 wherein the mineral acid is sulfuric acid.
5. The method according to claim 1 wherein the reaction is carried out at a temperature between about 20° C. and 100° C.
6. The method according to claim 1 wherein the allyl dithiocarbamate reactant is the haloallyl dithiocarbamate and the acid is concentrated hydrochloric acid.
7. The method according to claim 6 wherein the haloallyl dithiocarbamate is 2-chloroallyl dithiocarbamate.
8. The method according to claim 6 wherein the haloallyl dithiocarbamate is 2-bromoallyl dithiocarbamate.
9. The method according to claim 6 wherein a temperature of between about 30° C. and 100° C. is provided to effect cyclization.

References Cited
UNITED STATES PATENTS
2,547,723   4/1951   Sundholm _____ 260—327

JAMES A. PATTEN, *Primary Examiner.*